UNITED STATES PATENT OFFICE.

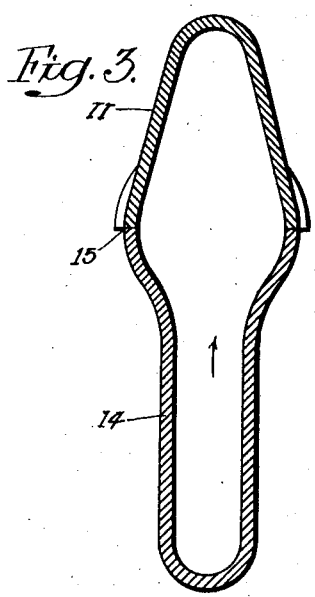
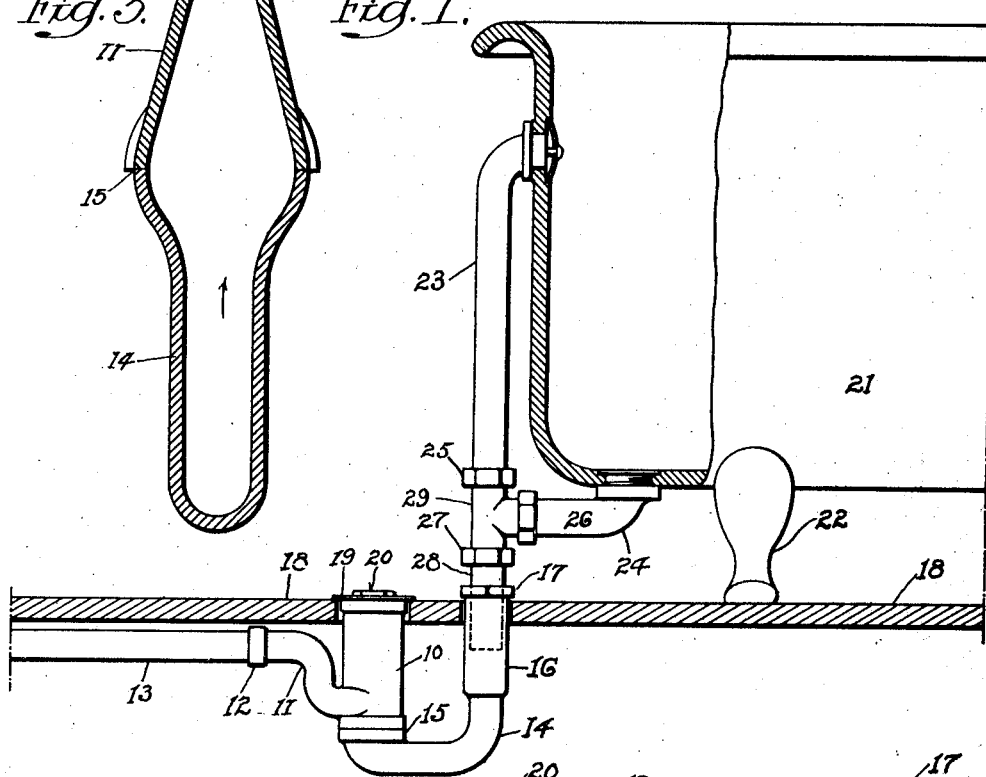
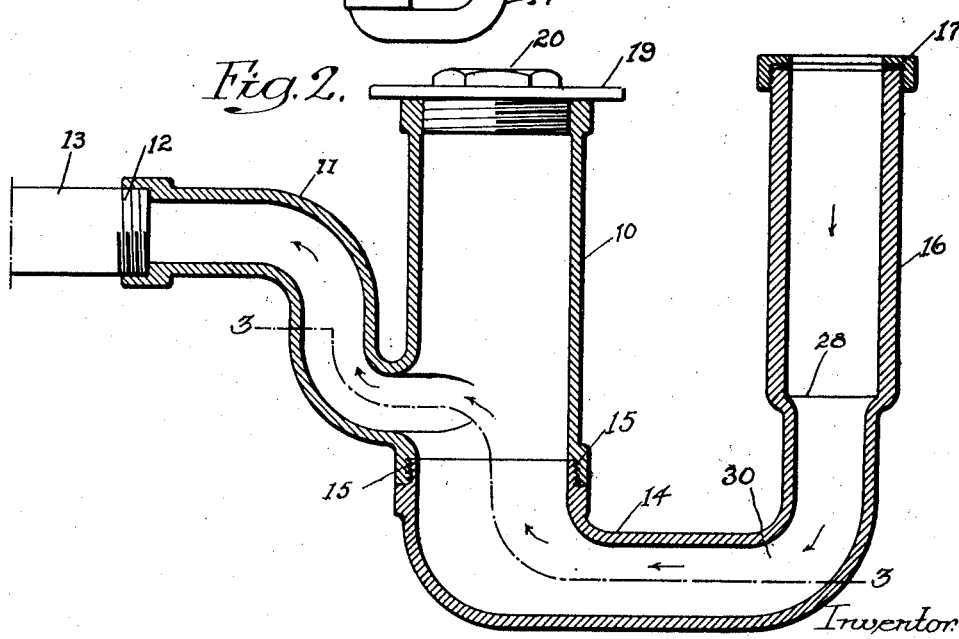

FRANKLIN G. HIRST, OF PHILADELPHIA, PENNSYLVANIA.

TRAP.

1,338,079.   Specification of Letters Patent.   Patented Apr. 27, 1920.

Application filed August 22, 1919. Serial No. 319,078.

*To all whom it may concern:*

Be it known that I, FRANKLIN G. HIRST, a citizen of the United States, residing at Philadelphia, in the county of Philadelphia and State of Pennsylvania, have invented certain new and useful Improvements in Traps, of which the following is a specification.

This invention relates to new and useful improvements in traps and more particularly to that class adapted to be used in connection with bath tubs, and an object of the invention is to provide a device of this class that may be connected to a bath tub with a minimum of material and labor.

A further object is to provide a device of the class described that is efficient, durable and one that when connected to the tub, ready access may be had thereto or to the tub, without the removal of either, and with a minimum amount of labor.

A still further object is to provide a trap whereby the water in passing therethrough is given an expansive action so that any foreign matter, such as match sticks, paper, etc., or solids held in suspension in the water are conducted along with the water and carried off without clogging up the trap or lodging in the body or on the sides thereof; such expansive action of the water will also thoroughly scour the inner surfaces of the trap and thereby remove any matter that might adhere to said surfaces and prevents the interior of said trap from becoming foul.

Other objects and advantages will be hereinafter referred to and more particularly pointed out in the claim.

In the accompanying drawings, which are made a part of this application,

Figure 1 is a side elevational view of my improved trap, illustrating same connected to a bath tub, a portion of said tub being broken away, Fig. 2 is a vertical sectional view of the trap and its connections, and Fig. 3 is a transverse sectional view taken on the line 3—3 of Fig. 2.

Corresponding and like parts are referred to in the following description and indicated, in all the views of the drawings by the same reference characters.

The numeral 10 denotes a cylindrical trap body, with its inner surfaces smooth.

An outlet pipe 11, preferably formed substantially similar to the letter S inverted, as illustrated, is cast integral with said trap body 10 on one side and substantially at the base thereof. A drain pipe 13 is threaded into said outlet pipe as at 12.

An inlet pipe 14 is threaded into the base opening of the trap body 10, as at 15, and is of substantially the same circumference as said trap body 10 at its point of connection. Said pipe 14 extends horizontally from said trap body 10 and then upwardly. A vertical sleeve 16 formed of cast iron, or other suitable material, slightly larger in circumference than the inlet pipe 14 is cast integral therewith, as illustrated, said sleeve 16 extending upwardly through the floor 18, through an opening therein. 18 represents the floor line of a room and 21 a bath tub of the conventional type, having the leg or support 22 between it and the floor 18. Said tub 21 is also provided with the usual overflow pipe 23 and the waste pipe 24 connected thereto in the customary way.

The head of the trap body 10 extends through an opening in the floor 18, and a cover 19 is threaded therein until said cover rests upon the floor 18. A hexagonal nut 20 is cast integral on the cover 19 providing means to remove said cover when requisite.

A T joint 29 connects the overflow pipe 23, the waste pipe 24 and a pipe 28 adapted for vertical movement in the sleeve 16, by means of the slip nuts 25, 26 and 27, as illustrated. A slip nut 17, provided as shown, regulates the movement of the pipe 28 within said sleeve 16 and firmly maintains it at any desired point therein.

This novel arrangement affords an economical advantage over the usual methods of connection in vogue in that the common practice is to solder a piece of lead pipe on the inlet pipe 14 at substantially the point indicated by the numeral 30 and then extend it upwardly through the floor 18 and slightly above the floor level. It is then flared out and tafted over the floor level providing a flanged support for the pipe thereon, a brass, or other, tube is then secured to the lead pipe by a solder joint and its other extremity is connected to the T joint 29 by the slip nut 27. In the event of any foreign substance lodging in the T joint 29 it necessitates either the breaking off of the solder joint or lifting the tub 21 off the brass tube by disconnecting the slip nuts 25, 26 and 27, while with the present device after the tub 21 is set the pipe 28 is extended and connected to the T joint 29 by means of the nut 27 and then is secured firmly in the sleeve 16 by means of the slip nut 17. To disconnect to gain access to the T joint 29 for removal of any foreign substance, or any other purpose, the pipe 28 is slipped downwardly in said sleeve 16 until it is free from the nut 27. It will be understood that sufficient space will be provided for the purpose between the nuts 17 and 27. Any foreign substance in the T joint 29 may be then readily removed by means of a wire or other implement.

It will be noted that the vertical portion of the inlet pipe 14 is narrower than the portion that is threaded into the trap body opening. By reason of this increase in area for the flow of water, the water flowing through said pipe acquires an expansive action as it reaches said wider portion of said inlet pipe and the base of the trap body 10, and as there are no square corners foreign substances or solids held in suspension by the water are carried off by the water and cannot lodge in the bottom of the trap or adhere to its inner surfaces. In addition said expansive action of the water will thoroughly scour the said inner surfaces of the trap body 10. In Fig. 3 I have illustrated the course of the water flowing through said trap and the varying areas thereof. The expanding action of the water will create a vortex adjacent to where the outlet pipe 11 enters the trap body 10 causing any foreign matter to dance or ride on the surface of the water, and same will flow off with the water through the outlet pipe 11 by reason of the vacuum created therein by the descent of the drain pipe 13. The slip nuts 17, 25, 26 and 27 are of the conventional kind, provided with a resilient washer of any suitable material, whereby as the nut is tightened the washer will firmly hold the pipe in place.

Although I have illustrated and described my invention in all its details of construction, it will of course be understood that I reserve the right to make any changes, within the scope of the appended claim, without in the slightest degree departing from the spirit of my invention.

What I claim is:

A trap, located beneath the floor line, comprising a body having a threaded opening in the base thereof, an integral outlet pipe extending from one side and adjacent to said base opening, a separable inlet pipe threaded to engage the threaded base opening of said trap body and being increased in width so that at its point of connection with said trap body it is of substantially the same circumference as said trap body, substantially as shown and described.

In testimony whereof I affix my signature.

FRANKLIN G. HIRST.